United States Patent [19]

Cease et al.

[11] Patent Number: 4,596,026
[45] Date of Patent: Jun. 17, 1986

[54] ASYNCHRONOUS DATA CLOCK GENERATOR

[75] Inventors: Richard G. Cease, Concord; Caesar J. Favaloro, Sudbury; James G. Hackendorf, Wayland, all of Mass.

[73] Assignee: Raytheon Company, Lexington, Mass.

[21] Appl. No.: 708,377

[22] Filed: Mar. 7, 1985

Related U.S. Application Data

[63] Continuation of Ser. No. 492,544, May 9, 1983, abandoned, which is a continuation of Ser. No. 211,498, Dec. 1, 1980, abandoned.

[51] Int. Cl.⁴ .......................................... H04L 25/36
[52] U.S. Cl. ........................... 375/118; 370/102; 370/108
[58] Field of Search ............... 375/106, 110, 118; 328/63, 72; 307/269; 370/100, 102, 108

[56] References Cited

U.S. PATENT DOCUMENTS

| | | | |
|---|---|---|---|
| 3,225,301 | 12/1965 | McCann | 328/63 |
| 3,241,122 | 4/1966 | Bardell | 307/269 |
| 3,420,956 | 1/1969 | Heightley | 375/118 |
| 3,531,777 | 9/1970 | West | 375/118 |
| 3,549,804 | 12/1970 | Greenspan | 375/110 |
| 3,745,472 | 7/1973 | Garth | 328/63 |
| 3,754,098 | 8/1973 | Abramson et al. | 375/118 |
| 3,825,683 | 7/1974 | Pitroda et al. | 375/118 |
| 3,893,033 | 7/1975 | Finch | 328/63 |
| 3,894,246 | 7/1975 | Torgrim | 307/208 |
| 4,025,720 | 5/1977 | Pachynski | 375/112 |
| 4,070,630 | 1/1978 | Hepworth | 328/63 |
| 4,119,796 | 10/1978 | Jones | 375/118 |
| 4,181,975 | 1/1980 | Jenkins | 375/118 |
| 4,187,394 | 2/1980 | Siever | 375/118 |
| 4,270,183 | 5/1981 | Robinson et al. | 375/118 |

Primary Examiner—Robert L. Griffin
Assistant Examiner—Stephen Chin
Attorney, Agent, or Firm—William R. Clark; Richard M. Sharkansky

[57] ABSTRACT

A circuit and method for generating a substantially smooth clock for clocking asynchronous data to a user device. Incoming asynchronous data is stored in an elastic buffer such as a first-in first-out memory. Periodically, an output identifiable bit is read into the memory and a multibit digital signal corresponding to the number of output clock pulses for it to be read out is determined. This signal, which corresponds to the occupancy of the first-in first-out memory, is used to generate an analog voltage which controls a voltage controlled oscillator that provides the substantially smooth clock for reading data out of the first-in first-out memory. The control loop causes the long term rate of the smooth clock to be substantially equal to the incoming asynchronous data rate.

13 Claims, 9 Drawing Figures

ASYNCHRONOUS DATA CLOCK GENERATOR

This application is a continuation of application Ser. No. 492,544 filed May 9, 1983 now abandoned which is a continuation of application Ser. No. 06/211,498 filed Dec. 1, 1980 now abandoned.

BACKGROUND OF THE INVENTION

In general, digital data communication systems may be categorized as synchronous or asynchronous. With a synchronous system, there is a fixed number of input data bits in each frame of the transmission channel. It is therefore apparent that there must be a fixed relationship between the input data or source clock and the clock of the transmission channel. Typically, this is provided by phase locking the source clock and the transmission channel clock. In the case where there are a plurality of input data sources or groups which are multiplexed into a higher rate transmission channel or supergroup, each group clock is assigned a fixed fraction of the bits of the supergroup and therefore each must be a fixed fraction of the supergroup rate.

In many applications, it is impossible or at least impractical to phase lock the input data clock to the transmission channel clock. Accordingly, asynchronous systems are in widespread usage. Generally, they may be defined as systems where the actual input rate and the nominal expected input rate of the data channel differ. The typical treatment for this type of data stream is to run the transmission channel at a higher rate than nominal by at least the maximum anticipated input rate deviation and then selectively pulse stuff dummy bits into designated bit positions in the input data stream to increase its rate to the transmission channel rate. Generally, a stuff code which indicates whether the designated stuff bit position or positions of the frame contain actual or dummy data is transmitted in the overhead of the channel. At the receiver side of the transmission channel, the dummy bits are removed in accordance with the stuff codes. Accordingly, it is common in communication systems to receive digital data where the bits are not in a contiguous periodic stream. Stated differently, received digital data frequently has data bits not present in bit positions because of the deletion of stuffed dummy bits, the deletion of channel overhead, or the demultiplexing of transmission channel data bits to another receiver channel. Typically, the data at the receiver is stored in an elastic buffer such as a first-in first-out memory. Because it is generally preferable and sometimes necessary that the data be transferred smoothly to a user device, there may be a requirement to generate clocking pulses that will read data smoothly out of the elastic buffer. The field of the invention relates generally to the reception and reclocking of asynchronous data.

In the prior art, the pulses for clocking data smoothly out of an elastic buffer have been provided by a voltage controlled oscillator which is controlled by a filtered phase detector output. The function of the phase detector in general terms is to compare the rate at which data is stored in the elastic memory with the rate at which it is read out and then to adjust the read out rate with a particular time constant such that the long term rates are the same. The most common prior art implementation of this principle is a phase-locked loop deriving its phase error input for the filter to the voltage controlled oscillator by sampling the store half full flag. More specifically, the up input of an up/down counter may be connected to the clock reading data into a first-in first-out memory and the down input connected to the voltage controlled oscillator output which clocks data out. The count in the up/down counter therefore is related to the occupancy of the first-in first-out memory. Accordingly, the up/down counter is configured so as to provide a high voltage (logical 1) output if the first-in first-out memory is less than half full and a low voltage (logical 0) output if the first-in first-out memory is half full or more. The logical output voltage of the up/down counter is then filtered and coupled to the voltage controlled oscillator. Accordingly, if the first-in first-out memory is less than half full, the rate at which data is read out is generally decreased and if it is half full or more, it is increased. The phase error may be sampled at the stuff opportunity time so as to eliminate the stuff opportunity rate as an output jitter component. A problem with this prior art approach is that it involves very careful selection of the phase lock loop parameters. In applications involving flexibility of clock rates and stuff opportunity rates as in most programmable multiplexers, it is difficult to attain the variable phase lock loop parameters.

Another prior art method for providing a smooth clock is to alternate between two clocks, one above nominal by more than the maximum input rate deviation and the other below nominal by the same amount. The actual clock oscillator rates may be chosen so as to reduce potential phase discontinuities at the switching time. If the elastic buffer is half full or more, the higher rate oscillator is selected causing store depletions. When the store becomes less than half full, the lower rate clock is selected allowing the store to again fill. This method, although simple, results in an output clock with no strong component within the input clock error band. Accordingly, subsequent narrow band filtering such as crystal filters may see no clock at all. In other words, the generator clock may not pass a narrow band filter in a user device because the band may be between the two clock oscillators or at least not contain them both.

SUMMARY OF THE INVENTION

The invention discloses the combination of an elastic store for storing incoming asynchronous digital data, means for providing a multibit digital signal corresponding to the occupancy of the elastic store, and means responsive to the signal for generating a substantially smooth clock having a long term rate substantially equal to the rate of said incoming asynchronous digital data. Smooth is a relative rather than an absolute term and herein it is a comparison with the clock of the incoming asynchronous digital data. In other words, the generated clock may not be stable but it will exhibit the properties of having fewer and smaller fluctuations in the data rate. It may be preferable that the elastic store comprise a first-in first-out memory. Further, the generating means may comprise a digital to analog converter and a voltage controlled oscillator.

The invention also defines an asynchronous data transferring circuit for generating a substantially smooth clock having a long term rate substantially equal to the rate of incoming asynchronous data, comprising means for storing digital data, means for deriving a plurality of logical voltages corresponding to the occupancy level of the storing means, and means responsive to the voltages for generating a substantially smooth clock for clocking data out of the storing means. It may be preferable that the storing means comprise a first-in first-out memory. Also, the storing means may further comprise a serial to parallel converter coupled to the input of the first-in first-out memory and a parallel to serial converter coupled to the output. The serial to parallel and parallel to serial converters may comprise shift registers. Furthermore, the deriving means may preferably comprise a counter reset by writing an occupancy determining logical voltage into a designated bit of the input word of the storing means and a storage latch responsive to reading the logical voltage out of the storing means for latching the contents of the counter. The occupancy determining logical voltage is preferably a single bit. It may be one state, for example a negative pulse, which is used to load the contents of the counter into the storage latch. Also, it may include the general category of a logical voltage which is recognizable or identifiable at the output of the first-in first-out memory such as, for example, a parity error induced into the parity error bit for the purpose of determining occupancy of the storing means. The storing means may preferably comprise a first-in first-out memory.

The invention may also be practiced by a first-in first-out memory for storing digital data words, means for writing a logical voltage into one bit position of the input word of the first-in first-out memory, the voltage corresponding to the commencement of a time interval used to determine the occupancy of the first-in first-out memory, a counter reset simultaneous to the writing of the voltage into the first-in first-out memory, means responsive to the reading out of the logical voltage from the first-in first-out memory for storing the contents of the counter, a digital to analog converter coupled to the output of the storing means, and a voltage controlled oscillator coupled to the output of the converter. Furthermore, the combination may further comprise means responsive to the output of the voltage controlled oscillator for reading digital data out of the first-in first-out memory. The reading means may comprise a counter and a parallel to serial converter, the counter having its input coupled to the output of the voltage controlled oscillator and its output coupled to the clock out of the first-in first-out memory and the input clock of the parallel to serial converter; the parallel to serial converter preferably has its input coupled to the output of the first-in first-out memory and its clock out coupled to the voltage controlled oscillator. Furthermore, it may be preferable that the combination further comprises a serial to parallel converter having its input adapted for serial asynchronous data and its output connected to the input of the first-in first-out memory.

The invention also teaches the combination of a first-in first-out memory having one bit of its input data terminal adapted for an input corresponding to the commencement of a time interval for determining the occupancy level of the first-in first-out memory, a counter reset simultaneous to the input, means responsive to reading the input out of the first-in first-out memory for storing the contents of the counter, means responsive to the storing means for providing an analog signal, and a voltage controlled oscillator coupled to the output of the converter means.

The invention also discloses a circuit for generating a smooth clock for clocking asynchronous data comprising a serial to parallel converter adapted for input of digital asynchronous data, the input clock of the converter being coupled to the clock of the asynchronous data, a first-in first-out memory having its input word terminal except for at least one bit connected to the output of said serial to parallel converter, at least one bit of said first-in first-out memory input word terminal adapted for input of a digital voltage used to determine the occupancy of the first-in first-out memory, means initiated simultaneous to inputting the voltage to said first-in first-out memory for generating a continuous count, means responsive to the voltage being read out of the first-in first-out memory for storing the output of the generating means, a digital to analog converter coupled to the output of the storing means for providing an analog signal derived from the count, and a voltage controlled oscillator coupled to the output of the digital to analog converter.

The invention may also be practiced by the method of providing a substantially smooth clock for clocking asynchronous digital data words out of a first-in first-out memory comprising the steps of writing a first-in first-out memory occupancy determining voltage into one bit of the input word of the first-in first-out memory, resetting a counter simultaneous to said writing step, storing the count of the counter in response to the voltage being read out of the first-in first-out memory, converting the output of the storing means to an analog signal, and generating a substantially smooth clock in responsive to said analog signal.

BRIEF DESCRIPTION OF THE DRAWINGS

The foregoing and other objects and advantages of the invention will be more fully and easily understood by reading to the following description of the preferred embodiment with reference to the drawings wherein.

DESCRIPTION OF THE PREFERRED EMBODIMENT

Figure 1:
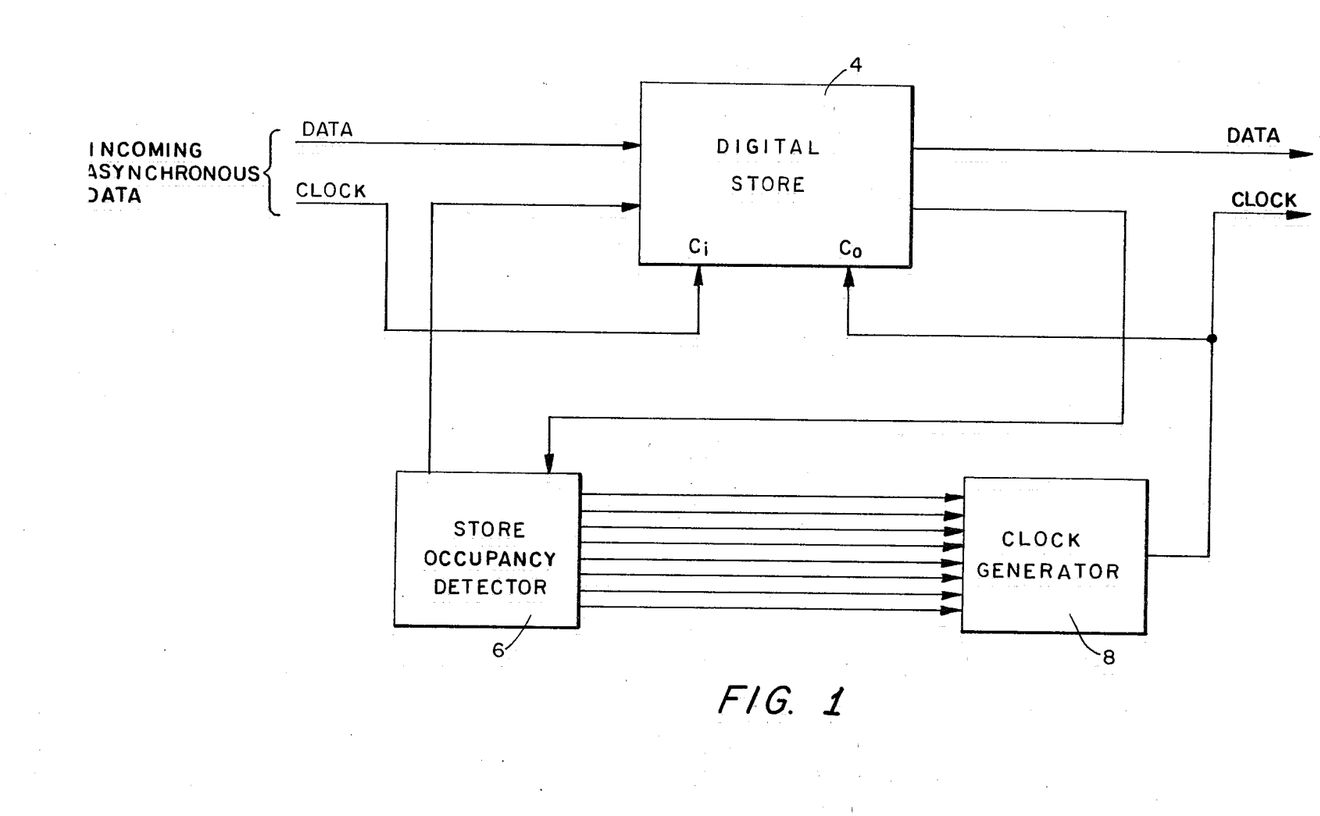
FIG. 1 is a block diagram embodying the invention.

Referring to FIG. 1, there is shown a block diagram embodying the invention. An application of the invention used to advantage is at the receiver side of a communications link where it is desirable to take the incoming asynchronous data and transfer it to a user device with a smooth clock. Digital store 4 may be defined as an elastic store or buffer memory, a preferred embodiment of which will be described in detail with reference to FIG. 2. The incoming asynchronous data which will be arriving at an unsmooth rate is clocked into digital store 4 by the asynchronous data clock which typically is "reconstructed" or "regenerated" at the receiver site by well known circuits operating in response to the asynchronous data channel.

An objective of the invention is to provide a smooth clock for reading the data out of digital store 4. Accordingly, it is desirable that the long term rate of the smooth clock be approximately equal to the incoming asynchronous data rate; otherwise, digital store 4 will either overflow or become empty. It has been found desirable to generate a substantially smooth clock that, with a particular time constant, attempts to keep the digital store at half full occupancy. To accomplish this, it is apparent that the occupancy of the digital store or a value corresponding to it must be known. The occupancy is determined by writing an output identifiable code into the digital store and measuring the elapsed time or a number related to it for the code to be processed through the digital store. The code may be a single bit of the input word of the digital store such as a first-in first-out (FIFO) memory; code embodiments are described with reference to FIG. 2. The time required for processing through digital store such as a FIFO memory is related to the occupancy of the store; it takes longer for an input to process through a full FIFO memory. The time or a value corresponding to it is recorded by initiating a counter when the output identifiable code is written into digital store by store occupancy detector 6. When the output identifiable code is read out of digital store, the counter is either stopped or its contents are stored. The recorded value in store occupancy detector 6 consists of a plurality of bits which are transferred to clock generator 8. Clock generator 8 in response to the plurality of bits corresponding to the occupancy of digital store generates a smooth clock for clocking data out of digital store. Clock generator 8, as shown in detail in FIG. 2, may comprise a digital to analog converter and a voltage controlled oscillator.

Figure 2:
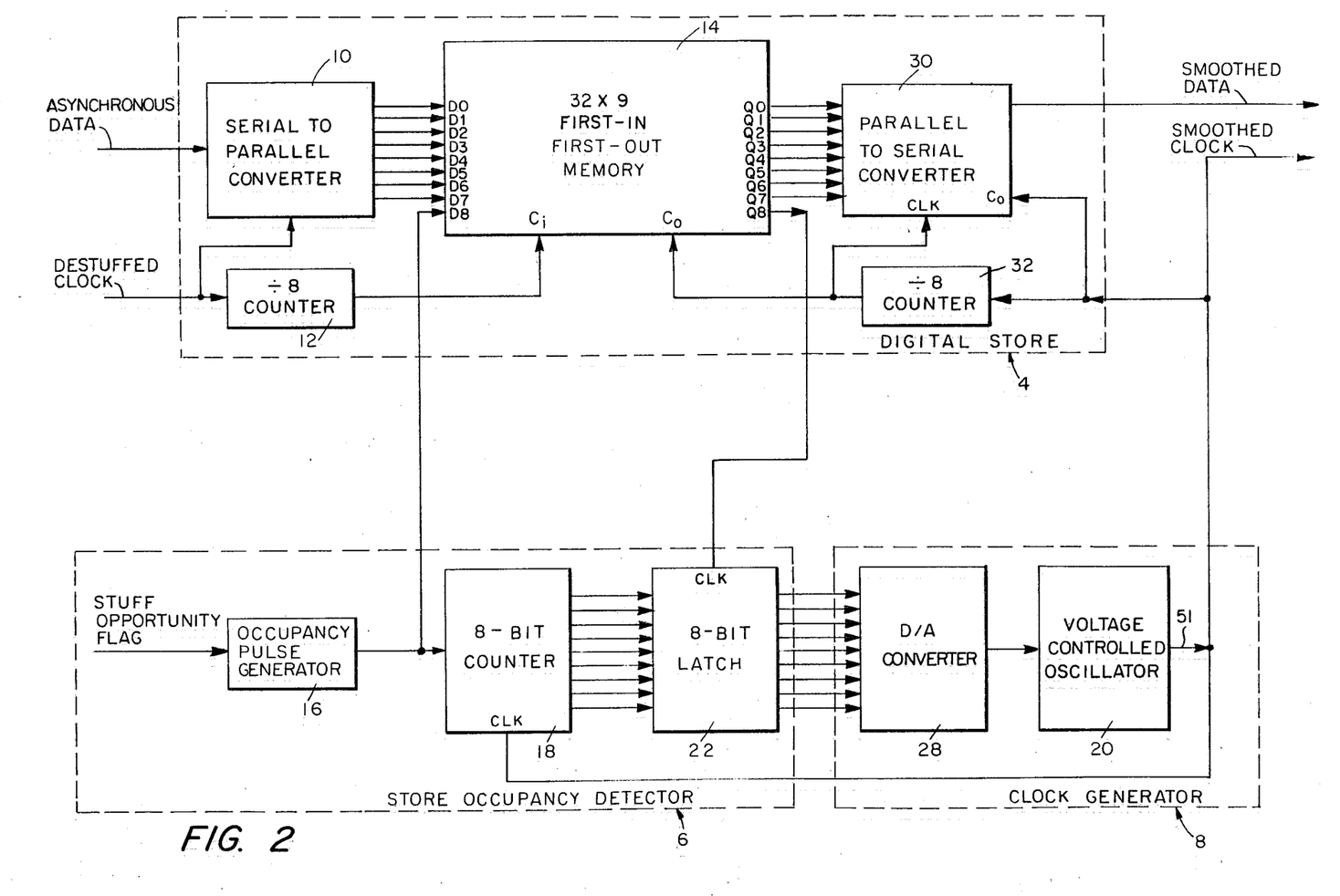
FIG. 2 is a circuit implementation of the block diagram of FIG. 1.

Referring to FIG. 2, there is shown a circuit implementation of the block diagram of FIG. 1 using the invention to advantage. The circuit comprises part of the receiver side of an asynchronous communications system.

Figures 3, 3A, 3E:
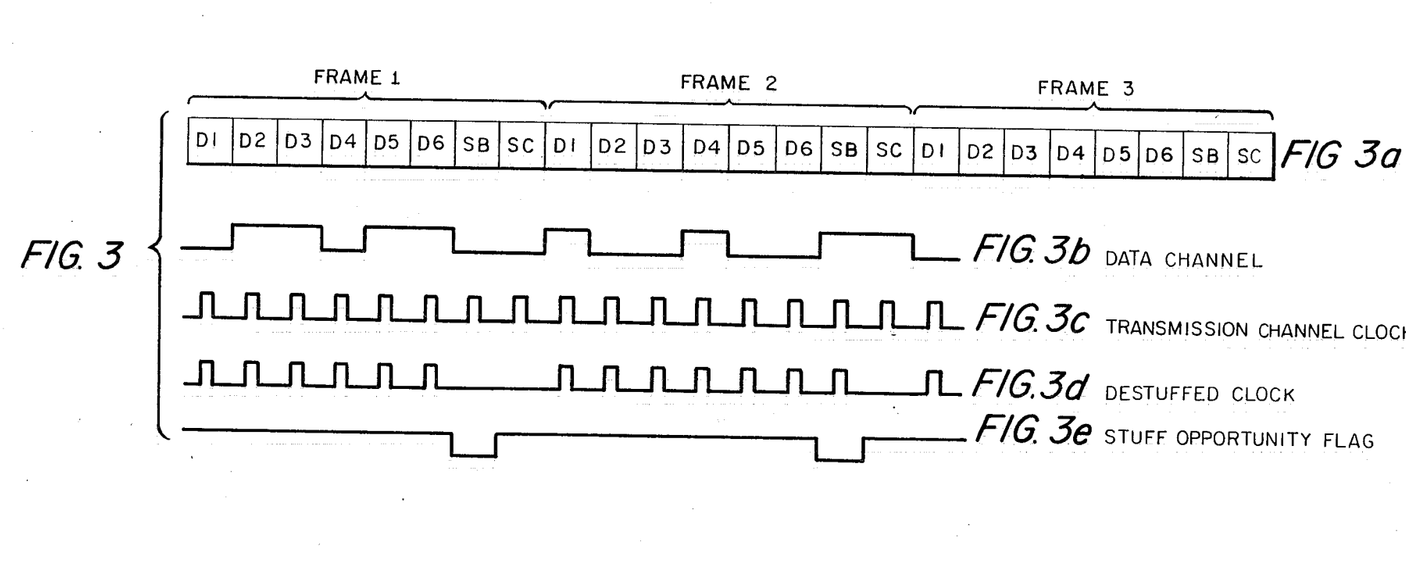
FIG. 3 comprises FIGS. 3a–e and shows a sample frame and waveforms including the data channel, transmission channel clock, destuffed clock and stuff opportunity flag.

Referring to FIGS. 3a–e, there are shown various waveforms which define the asynchronous data, destuffed clock, and stuff opportunity inputs of FIG. 2. FIG. 3a shows the transmission frame format defining the assignment of the various serial bit positions. Specifically, each frame consists of data bits D1-6, stuff bit (SB) and stuff code (SC). For this description, a logical 1 in the stuff code position indicates that the stuff bit position immediately prior to it is actual data. Also, a logical 0 in the stuff code position indicates that there is a dummy bit in the stuff bit position and therefore should be deleted or disregarded. The frame format of FIG. 3a is exceptionally simple for purposes of teaching the invention; in actual practice, the frames may be many orders of magnitude larger than that depicted and may contain various overhead functions. FIGS. 3b and 3c respectively show the asynchronous data channel and the transmission channel clock which may be "regenerated" from the data at the receiver side of the communications system or transmitted with the data. With the example given, data bits D1 through D6 of frame 1 are respectively 011011. The stuff code being a logical 0 indicates the stuff bit is dummy data. Accordingly, the destuffed clock of FIG. 3d would clock data D1 through D6 into the digital store but the stuff bit would not be clocked in. In frame 2, data bits D1 through D6 are respectively 100100. The stuff code being a logical 1 indicates that the stuff bit is data so a destuffed clock pulse is provided for that bit position to clock a logical 1 into the digital store. The stuff opportunity flag of FIG. 3e goes low every time there is a stuff bit opportunity whether the result is actual data or a dummy bit.

Figure 4:
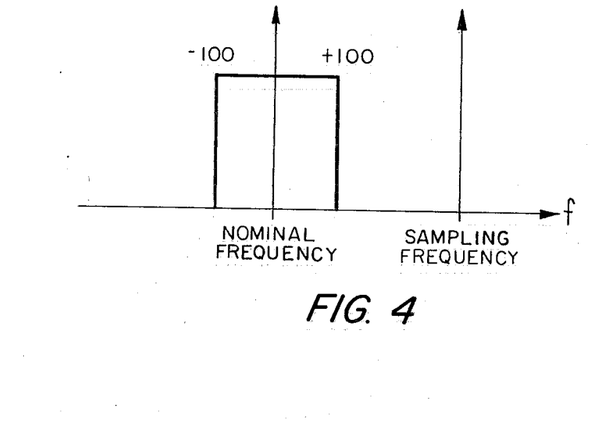
FIG. 4 is a graph showing the relationships of the nominal frequency, expected deviation, and sample frequency.

The waveforms of FIG. 3b–3e are typical of prior art asynchronous communications systems. As described in the background herein, they commonly arise as the result of an asynchronous system where a transmission channel clock is used which is greater in rate than the maximum deviation from nominal. For example, in FIG. 4, a graph is shown where the input data has an expected nominal frequency with an unknown deviation of $-100$ to $+100$ parts per million. The transmission channel sampling frequency is selected to be higher than the maximum deviation so that data will never back up at the transmitter side of the link. Then, dummy bits are inserted when necessary to make the input rate equal the sampling frequency. Typically, the nominal frequency may be in the range from 8 kilobits to 40 megabits. It is the problem of generating a smoothing clock for clocking the received asynchronous data of FIG. 3b to a user device that the invention addresses.

Referring again to FIG. 2, the incoming asynchronous data such as that of FIG. 3b is clocked into serial to parallel converter 10 by the destuffed clock such as shown in FIG. 3d. The use of the destuffed clock eliminates dummy bits and insures that only actual data is clocked into converter 10. The function of converter 10 is to format the serial asynchronous data into parallel bit words for writing into first-in first-out (FIFO) memory 14 which serves as an elastic buffer memory. The storage capacity of FIFO memory 14 was selected to be 32 nine bit words ($32 \times 9$) although one skilled in the art will realize that the invention could be used to advantage with many other FIFO storage configurations. However, once the FIFO memory was selected to have a nine bit data word input and one bit was designated as being "output identifiable" for determining occupancy, eight bits were left for data input. Accordingly, it was preferable that for the described embodiment, serial to parallel converter 10 be an eight bit shift register having the destuffed clock clocking asynchronous serial data in. After eight data bits are clocked into serial to parallel converter 10, $\div 8$ counter 12 provides a carry out pulse to clock in, $C_i$, of FIFO memory 14 and the contents of converter 10 are read into data inputs D0-7 respectively.

Input D8 of FIFO memory 14 is connected to occupancy pulse generator 16. The embodiment of FIG. 2 involves the derivation of a multibit signal corresponding to the occupancy level of FIFO memory 14. To accomplish this, an output identifiable one bit code is written into FIFO memory 14 and a multibit signal directly proportional to the time for it to process through the FIFO memory is recorded. Occupancy pulse generator 16 provides the output identifiable one bit code. It is desirable that the output code of occupancy pulse generator 16 be read into D8 of FIFO memory 14 at some time period which is large with respect to the period of the FIFO memory input clock, $C_i$. In actual hardware implementation, the number of bits in a frame is much larger than shown in FIG. 3a which was depicted for illustration only. Accordingly, a negative stuff opportunity flag as shown in FIG. 3e only occurs once every several thousand data bits. Therefore, occupancy pulse generator 16 accepts the stuff opportunity flag and stretches the negative pulse so that it has a length of eight destuffed clock pulses so as to guarantee that once every several hundred data word inputs to the FIFO memory, a logical 0 is written into D8. For the data and timing diagrams of FIGS. 3a-e, occupancy pulse generator 16 may preferably be a counter having a low output voltage for eight destuffed clock pulses occurring at a period that is large with respect to the time to process through a full FIFO memory such as, for example, once every 50 stuff opportunity flags. The design of an occupancy pulse generator having the output waveforms described in response to a stuff opportunity flag input is well known to those skilled in the art. Furthermore, it would be obvious to those skilled in the art that the loading of a logical 0 into D8 does not have to correspond to the stuff opportunity flag; it is only desirable that it be periodic and necessary that it occurs less often than once every 32 clock in ($C_i$) pulses for the embodiment shown. As will become apparent later herein, the period of the output code from occupancy pulse generator determines the rate that the smoothed clock is adjusted so as to make its long term rate substantially equal to the asynchronous data rate. In an alternate embodiment, occupancy pulse generator 16 may also function as a conventional parity bit generator providing a parity bit corresponding to, for example, the contents clocked into serial to parallel converter 10. In such embodiment, occupancy pulse generator 16 would provide a parity bit to D8 of FIFO memory 14 for each data word written into D0-7. At the time for determining FIFO memory occupancy, occupancy pulse generator 16 would induce a parity error which would be input to D8 simultaneous to resetting counter 18. The line in FIG. 2 connecting 8-bit counter 18 and D8 of FIFO memory 14 would not be present as, for reasons described later herein, counter 18 should only be reset when there is an induced parity error marking the commencement of a FIFO memory occupancy determining period. A parity error detector at the output of FIFO memory 14 would detect the parity error and provide a latch pulse to 8-bit latch 22 which latches the digital value of counter 18 which corresponds to the occupancy of the FIFO memory.

Returning to the embodiment shown in FIG. 2, 8-bit counter 18 is reset by the negative pulse written into FIFO memory D8 and defined herein as the output identifiable one bit code commencing a time interval used to determine the occupancy of FIFO memory. Counter 18 then starts to count at the output rate of voltage controlled oscillator 20; it is noted, however, that any appropriate clock could be used for clocking counter 18. In fact, a faster input clock for counter 18 would provide more precise control of voltage controlled oscillator 20. When the negative one-bit code outputs at Q8 of FIFO memory 14, the contents from 8-bit counter 18 are read into 8-bit latch 22. Accordingly, the contents of 8-bit latch 22 is 8 bits of data which correspond to the occupancy of FIFO memory 14. More specifically, the output of voltage controlled oscillator is divided by 8 in counter 32 and used to clock data out of FIFO memory 14 by providing pulses to clock out ($C_o$). Therefore, since 8-bit counter 18 is clocked eight times as fast as data words are read out of FIFO memory 14, if the occupancy of FIFO memory was two words, the digital value of decimal 16 ($2 \times 8$) would be stored in 8-bit latch 22. Similarly, if the occupancy of FIFO memory was 30 words, the digital value of decimal 240 ($30 \times 8$) would be stored in 8-bit latch 22. Once stored, the contents of 8-bit latch 22 remains the same until another occupancy determining process is performed and another negative pulse is present at Q8 of FIFO memory 14 loading another digital value into 8-bit latch 22.

The digital contents of latch 22 is converted to an analog signal in digital to analog converter 28 which analog signal provides a quantized DC control voltage to conventional narrow band voltage controlled oscillator 20. As the analog voltage increases, the voltage controlled oscillator output increases and vice versa. The voltage controlled oscillator output is the smooth clock provided to the user device. It is also the clock used to clock data out of parallel to serial converter 30 which may preferably be a shift register. In summary, the circuit of FIG. 2 generates a substantially smooth clock which is provided to the user device and which is used to clock data out of FIFO memory 14.

In operation, the voltage controlled oscillator may be adjusted or selected so that its center operating frequency is equal to the expected nominal frequency of incoming asynchronous data. The objective of its output is to maintain the FIFO memory at half occupancy. Accordingly, when the FIFO memory is more than half full, the output of the voltage controlled oscillator will be increased. Similarly, when the occupancy of the FIFO memory is less than half, the rate of the voltage controlled oscillator will be decreased. The steps of frequency adjustment at the output of the voltage controlled oscillator are much more accurate than in prior art systems providing a smoother clock. The word smooth is a relative term and does not mean that it provides a stable clock. The output of the voltage controlled oscillator will vary in small steps which will make the long term rate of the clock substantially equal to the input rate of the asynchronous serial data. The time period between making small adjustments to the output frequency of the voltage controlled oscillator is determined by the frequency of commencing the occupancy determining process described herein.

Figure 5:
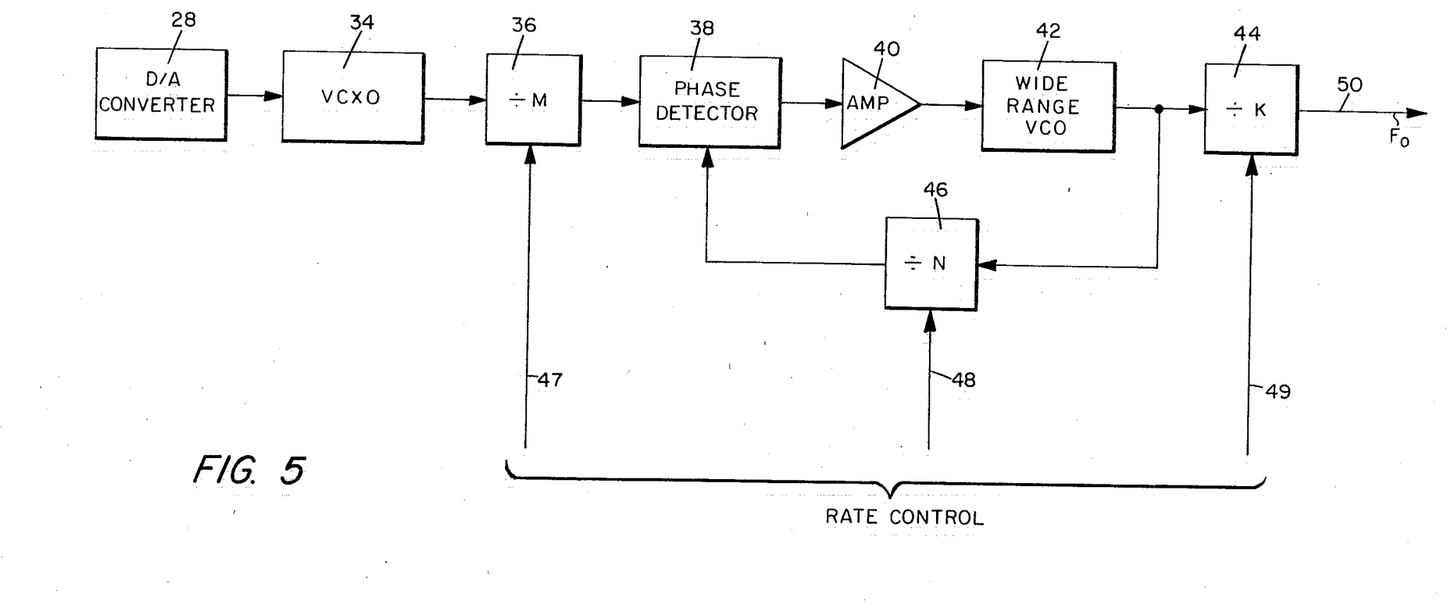
FIG. 5 shows an alternate embodiment for generating a smooth clock from the output of the digital to analog converter of FIG. 2.

Referring to FIG. 5, an alternate embodiment corresponding to voltage control oscillator 20 of FIG. 2 is shown. More specifically, the digital to analog converter 28 of FIG. 2 corresponds to the digital to analog converter 28 of FIG. 5. Also, line 51 of FIG. 2 corresponds to line 50 of FIG. 5. Commercially available voltage control oscillators 20 as shown in FIG. 2 provide a relatively wide frequency selection range. However, the oscillators are generally not temperature stable and the output signals are relatively noisy. Although voltage controlled crystal oscillators are relatively temperature stable and do provide clean outputs, they generally have a relatively narrow frequency selection range. Accordingly, voltage controlled crystal oscillators do not provide for the flexibility of varying the asynchronous data input rate. The circuit of FIG. 5 shows a circuit which is programmable and has the desirable properties of flexible input range, temperature stability, and clean output signal.

Still referring to FIG. 5, a conventional $(M/N \cdot K)F_{vcxo}$ circuit is shown. More specifically, voltage controlled crystal oscillator 34 provides a relatively clean and temperature stable output over a narrow band. The output is connected to $\div M$ 36 which typically comprises a digitally controlled counter. The output of $\div M$ 36 is connected to phase detector 38 which is coupled to amplifier 40. The output of amplifier 40 is coupled to wide range voltage controlled oscillator 42, the output of which is fed back through $\div N$ 46 to phase detector 38. The output of wide range voltage controlled oscillator 42 is also coupled to $\div K$ 44 having an output on line 50. The output, $F_0$, on line 50 has a frequency in this conventional circuit of $M/N \cdot K$ times the frequency of the voltage controlled crystal oscillator where M, N and K are generally adjustable divide factors as controlled by a digital rate control on lines 47, 48 and 49 respectively. By changing the values of M, N and K, the rate control can make the circuit flexible over a wide range of input asynchronous data rates.

This concludes the description of the preferred embodiment. The reading of it by one skilled in the art will bring to mind many alterations and modifications without departing from the spirit and scope of the invention. Accordingly, it is intended that the scope of the invention be limited only by the appended claims.

What is claimed is:

1. In combination:
    a serial to parallel converter for converting incoming asynchronous serial digital data to data words;
    an elastic store connected to the output of said converter for storing a plurality of said data words;
    means for sequentially clocking said data words into said elastic store;
    means for clocking said data words out of said elastic store;
    means for providing a signal corresponding to the occupancy of said elastic store, said providing means comprising means for measuring the time interval between one of said data words being clocked into said elastic store and said one being clocked out of said store; and
    said clocking out means comprising means responsive to said signal for generating a substantially smooth clocking out clock having a long term rate substantially equal to the rate of said clocking into means.

2. The combination in accordance with claim 1 wherein said elastic store comprises a first-in first-out memory.

3. The combination in accordance with claim 1 wherein said generating means comprises a voltage controlled oscillator.

4. An asynchronous data transferring circuit for generating a substantially smooth clock having a long term rate substantially equal to the rate of incoming asynchronous serial digital data, comprising:
    a serial to parallel converter for converting said serial data to data words;
    a first-in first-out elastic store connected to the output of said converter for storing a plurality of said data words;
    means for clocking said data words into said elastic store;
    means for clocking said data words out of said elastic store;
    a parallel to serial converter connected to the output of said elastic store for receiving said data words clocked out of said elastic store;
    means for measuring the time interval between one of said data words being clocked into said elastic store and said one being clocked out of said elastic store;
    means responsive to said measuring means for providing an analog signal corresponding to the occupancy of said elastic store;
    means responsive to said analog signal for generating said substantially smooth clock having a long term rate substantially equal to the rate of said incoming asynchronous serial digital data, said substantially smooth clock being used to clock said digital data words out of said parallel to serial converter; and
    said elastic store clocking out means comprising a divider for dividing said substantially smooth clock.

5. The circuit recited in claim 4 wherein said elastic store comprises a first-in first-out memory.

6. The circuit recited in claim 4 wherein said measuring means comprises means for writing a predetermined logical voltage into said elastic store in parallel with said one of said data words to form a storage word, a counter reset by writing said predetermined logical voltage into said elastic store, said logical voltage being read out of said elastic store by said clocking out means, and a storage latch responsive to reading said logical voltage out of said elastic store for latching the contents of said counter.

7. The circuit recited in claim 5 wherein said measuring means comprises means for writing a predetermined logical voltage into said first-in first-out memory in parallel with said one of said data words to form a storage word, a counter reset by writing said predetermined logical voltage into said first-in first-out memory, said predetermined logical voltage being read out of said first-in first-out memory by said clocking out means, and a storage latch responsive to reading said logical voltage out of said first-in first-out memory for latching the contents of said counter.

8. The circuit recited in claim 4 wherein said generating means comprises a voltage controlled oscillator.

9. A circuit for generating a smooth clock for clocking asynchronous data comprising:
    a serial to parallel converter for converting said digital asynchronous serial data to data words;
    a first-in first-out memory having its input word terminal except for at least one bit connected to the output of said serial to parallel converter for receiving said data words;
    means for providing a predetermined digital voltage to said at least one bit of said first-in first-out memory input word terminal;
    means initiated simultaneous to inputting said voltage to said first-in first-out memory for generating a continuous count;
    means comprising a voltage controlled oscillator for reading words out of said first-in first-out memory;
    means responsive to said voltage being read out of said first-in first-out memory for storing the output of said generating means wherein said stored count corresponds to the number of digital words stored in said first-in first-out memory;
    a digital to analog converter coupled to the output of said storing means for providing an analog signal derived from said count, the output of said digital to analog converter being coupled to said voltage controlled oscillator as a control signal for increasing or decreasing the rate of said reading out of said first-in first-out memory as a function of the occupancy level of said first-in first-out memory.

10. The circuit recited in claim 9 wherein said generating means comprises a counter.

11. The circuit recited in claim 9 wherein said storing means comprises a latch memory.

12. The circuit recited in claim 9 wherein the clock out of said first-in first-out memory is responsive to the output of said voltage controlled oscillator.

13. The method of providing a substantially smooth clock for clocking asynchronous digital data words out of a first-in first-out memory comprising the steps of:

writing a predetermined logical voltage into a designated bit of an input word clocked into said first-in first-out memory;

resetting a counter simultaneous to said writing step;

storing the count of said coutner in response to said voltage being read out of said first-in first-out memory;

converting said count to an analog signal; and generating a substantially smooth clock in response to said analog signal.

* * * * *